United States Patent
Rübbelke

(10) Patent No.: US 7,381,042 B2
(45) Date of Patent: Jun. 3, 2008

(54) NOZZLE HEAD FOR AN EXTRUDER

(76) Inventor: Ingo Rübbelke, Seitenweg 20, Delbrück (DE) 33129

( * ) Notice: Subject to any disclaimer, the term of this patent is extended or adjusted under 35 U.S.C. 154(b) by 0 days.

(21) Appl. No.: 10/568,103

(22) PCT Filed: Oct. 15, 2003

(86) PCT No.: PCT/DE03/03445

§ 371 (c)(1), (2), (4) Date: Aug. 21, 2006

(87) PCT Pub. No.: WO2005/016627

PCT Pub. Date: Feb. 24, 2005

(65) Prior Publication Data

US 2007/0141194 A1    Jun. 21, 2007

(51) Int. Cl.
*B29C 47/06* (2006.01)
*B29C 47/36* (2006.01)

(52) U.S. Cl. .............. 425/133.1; 264/209.2; 425/380; 425/382.3; 425/382.4; 425/462

(58) Field of Classification Search ............. 425/133.1, 425/380, 382.3, 382.4, 381.2, 461, 462; 264/209.2
See application file for complete search history.

(56) References Cited

U.S. PATENT DOCUMENTS

| | | |
|---|---|---|
| 3,099,860 A | 8/1963 | Schippers |
| 4,151,242 A * | 4/1979 | Sansone ................ 264/68 |
| 4,395,221 A | 7/1983 | Herrington |
| 4,565,510 A * | 1/1986 | Kirjavainen .......... 425/113 |
| 4,731,216 A | 3/1988 | Topolski |
| 7,131,829 B2 * | 11/2006 | Nagai et al. .......... 425/107 |
| 2007/0096358 A1 * | 5/2007 | Pelcz et al. .......... 264/209.8 |

FOREIGN PATENT DOCUMENTS

| | | |
|---|---|---|
| DE | 18 10 237 A | 6/1970 |
| DE | 199 23 973 A1 | 2/2003 |
| GB | 987 809 A | 3/1965 |

* cited by examiner

*Primary Examiner*—Robert B. Davis
*Assistant Examiner*—Joseph Leyson
(74) *Attorney, Agent, or Firm*—Birch, Stewart, Kolasch & Birch, LLP

(57) ABSTRACT

A die head for an extruder including an outer shell, an inner cylindrical mandrel, an annular die gap at a discharge side of the die head, at least one intake opening for receiving a melted mass, at least one distribution element for distributing the melted mass to a central ring channel terminating in the die gap, an inflow channel connecting the at least one intake opening to the at least one distribution element. Further, at least one of the distribution element and the inflow channel are formed such that the distribution element is set into torsional motion around a longitudinal axis of the mandrel due to an flow of the melted mass, and the flow of melted mass is routed to the central ring channel.

17 Claims, 5 Drawing Sheets

NOZZLE HEAD FOR AN EXTRUDER

This Nonprovisional application is a National Stage application of PCT/DE03/03445, filed on Oct. 15, 2003, and claims priority under 35 U.S.C. § 119(a) on Patent Application No(s). PCT/DE03/02733 filed in Germany on Aug. 13, 2003, the entire contents of which are hereby incorporated by reference.

BACKGROUND OF THE INVENTION

1. Field of the Invention

The present invention is related to a die head for an extruder including an outer shell, an inner cylindrical mandrel, an annular die gap located at discharge side of the die head, an intake opening located at an intake side of the die head for receiving a melted mass, and at least one rotatable distribution element for distributing the melted mass in a central ring channel merging into the die gap.

2. Description of the Background Art

DE Patent publication No. 199 23 973 A1 illustrates a known die head for an extruder. In more detail, this DE publication illustrates a die head including an outer shell and an inner cylindrical mandrel. The outer shell and the mandrel are formed of segments, in which each segment has insert members for routing an inflowing melted mass from an intake side through a central ring channel. The central ring channel then merges into a die gap on a discharge side of the die head. Further, inside the die head, the melted mass is spirally guided before it exits, under pressure, in an axial direction through the die gap. However, the extruded melted mass generally includes joint lines and flow marks caused by the melted mass being guided through the die head.

SUMMARY OF THE INVENTION

Accordingly, one object of the present invention is to address the above-noted and other problems.

Another object of the present invention is to provide a die head for an extruder that extrudes a homogeneous melted mass that is free of joint lines and flow marks.

To achieve these and other advantages and in accordance with the purpose of the present invention, as embodied and broadly described herein, the present invention provides a die head for an extruder including an outer shell, an inner cylindrical mandrel, an annular die gap at a discharge side of the die head, at least one intake opening for receiving a melted mass, at least one distribution element for distributing the melted mass to a central ring channel terminating in the die gap, an inflow channel connecting the at least one intake opening to the at least one distribution element. Further, at least one of the distribution element and the inflow channel are formed such that the distribution element is set into torsional motion around a longitudinal axis of the mandrel due to a flow of the melted mass, and the flow of melted mass is routed to the central ring channel.

Thus, the present invention is particularly advantageous in that a more homogeneous melted mass is provided as well as extrudates that are free of joint lines, whereby an intensive agitation of the melt takes place. Further, the present inventor advantageously determined that a distribution element could be set into torsional motion via the melted mass flowing tangentially to its periphery due to the viscous drag effect of the melted mass sticking to the walls of the distribution element. In addition, the distribution element may have an annular shape or a polygonal shape, which preferably has a peripheral surface that resembles a ring.

Further, a thrust force resulting from the material expansion of the melted mass after emerging from orifices of the distribution element is advantageously utilized to support the outer drag moment during the rotation of the distribution element. In addition, inside the inner circular ring segment, individual flows of melted mass, which are divided by orifices, are positioned on top of each other in a radial direction as a result of the rotation of the distribution element, and are routed inside the central ring channel to the die gap.

Also, the distribution element includes a plurality of lamellae with interspersed orifices, which are arranged at a slant such that the forces resulting from the material expansion at the orifice exits generate a thrust moment. Thus, the outer drag moment and the inner thrust moment favorably increase a total torsional moment of the distribution element. That is, a required torque can be generated in this way to overcome friction resistances and to set the distribution element into rotation, namely, around a symmetrical axis of the mandrel.

In addition, at least one inflow channel extends in a tangential direction along a peripheral segment of the distribution element. Thus, due to the tangential inflow of the melted mass (particularly of the partial melt flows) to the distribution element, a drive torque for rotating the distribution element can be advantageously generated.

Further, an inflow channel engages with an outer peripheral segment of the distribution element so that as large a peripheral surface (effective area) of the distribution element as possible is affected by the tangentially-oriented flow of melted mass. Also, one end of the inflow channel extends within a close proximity to the outer periphery of the distribution element. In addition, a height of the inflow channels may be set equal to a height of the distribution element. However, it is preferable that the height of the inflow channel increases along the tangential course of the inflow channels. In this way, a flow direction that is tangential to the periphery of the distribution element is achieved.

Further, the outer periphery of the distribution element is also engaged by at least one inflow channel. In addition, the lamellae of the distribution element are arranged such that the melted mass flowing tangentially to an outer periphery (thereby forming an obtuse angle) passes from the outer periphery of the distribution element into an area inside the distribution element, subsequently to be routed via an inner annular segment to a central ring channel.

In addition, the outer shell is formed in segments, and the shell segments and distribution elements are stacked on top of each other. In this manner, coextrusion can be generated. Alternatively, the shell segments can be separate to beneficially move the pre-distribution of the melted mass to separation planes of the shell segments. In this manner, the tool-related part of the melt infeed required for the coextrusion can be realized in a beneficial manner.

BRIEF DESCRIPTION OF THE DRAWINGS

The present invention will become more fully understood from the detailed description given hereinbelow and the accompanying drawings which are given by way of illustration only, and thus, are not limited of the present invention, and wherein.

DETAILED DESCRIPTION

Reference will now be made in detail to the preferred embodiments of the present invention, examples of which are illustrated in the accompanying drawings.

Figure 1:
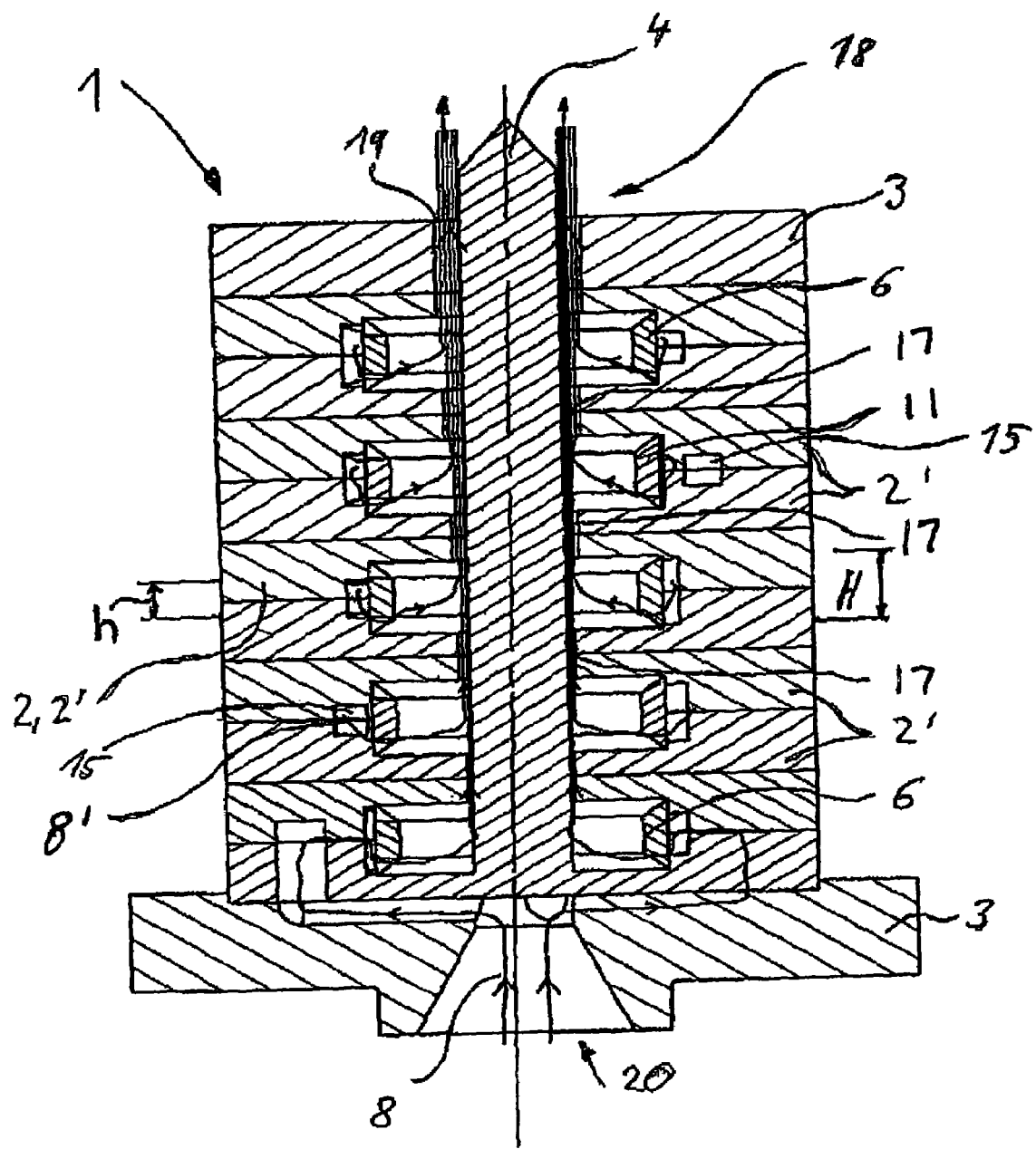
FIG. 1 is a longitudinal section of a die head in accordance with an embodiment of the present invention.

In more detail, and as shown in FIG. 1, the die head 1 in accordance with an embodiment of the present invention includes an outer shell 2, an inner cylindrical mandrel 4, and a distribution element 6 provided in an area between the outer shell 2 and the mandrel 4. Further, as shown in FIG. 2, the die head 1 includes inflow channels 16 (e.g., $16_1$, $16_2$, and $16_3$) surrounding a periphery of the mandrel 4, and at least one intake opening 15 arranged on an exterior shell surface of the die head 1 for receiving a melt flow.

In addition, as shown in FIG. 1, the die head 1 is segmented in an axial direction and includes a plurality of shell segments 2', each having a dedicated distribution element 6. Further, the die head 1 is particularly suited for forming a coextrusion, which is a process of extruding two or more materials. Also, as can be seen in FIG. 1, each shell segment 2' has intake openings 15, from which inflow channels 16 extend in a direction of the distribution element 6 (see also FIG. 2). As shown in FIGS. 1 and 2, after a melt flow (e.g., partial melt flows 8, 8', and 8'') pass through orifices 7 included in the distribution element 6, the partial flows are routed along a central ring channel 17 and along the mandrel 4 to a die gap 19 arranged on a discharge side 18 of the die head 1.

Further, as shown in FIG. 1, the die head 1 also includes cover plates 3 on the discharge side 18 as well as on an intake side 20 of the die head 1. The cover plates 3 press together the shell segments 2' so as to secure the shell segments 2' using bolts, for example. In addition, as shown in FIGS. 1 and 2, in a first shell segment 2' facing the intake side 20 of the die head 1, a first melt flow 8 of a first synthetic material is conveyed to the central ring channel 17, and in a subsequent shell segment 2' in the direction of the flow, a second synthetic material 8' of a different material is feed via an intake opening 15 (see in particular FIG. 2) arranged laterally to the die head 1 and peripherally adjacent to the first plastic melt 8 through the central ring channel 17. Additional shell segments 2' and/or distribution elements 6 can follow in the direction of the mandrel 4, whereby laterally further melt flows (e.g., melt flow 8'' in FIG. 2) of identical or different material can be introduced.

Figure 2:
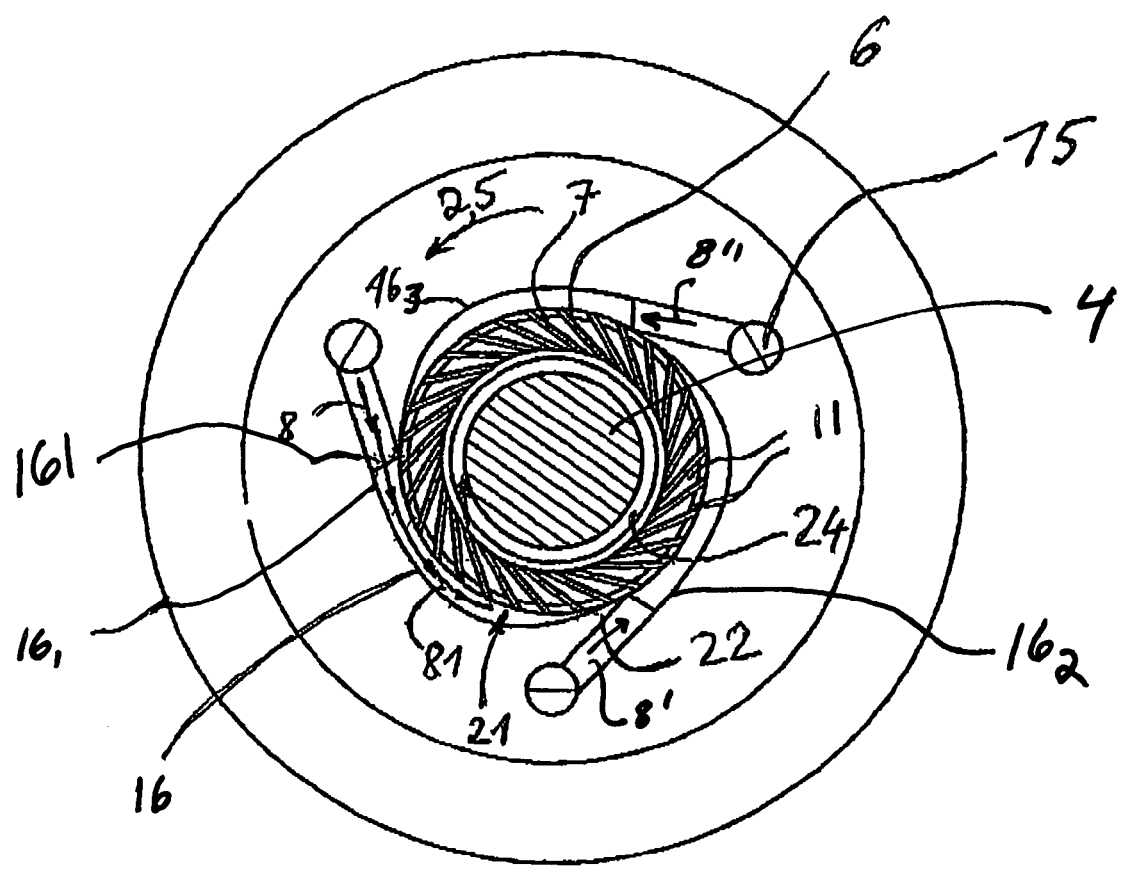
FIG. 2 is a cross section of a die head in accordance with an embodiment of the present invention.

In addition, as shown in FIG. 2, the distribution element 6 extends at a radial distance from the mandrel 4. In the example shown in FIG. 2, the distribution element 6 has an annular arrangement with a plurality of lamellae 11 interspersed with orifices 7. Further, the lamellae 11 can be tapered towards the inside, and are preferably pointed or rounded towards an interior of the distribution element 6, whereby inert zones and negative effects resulting from long dwelling times, swirling etc. are avoided. Also, surfaces of the lamellae 11 forming the orifices 7 may have a planar or convex shape. A cross section of the orifices 7 may also be narrow in the direction of the flow, or may remain constant. Further, a base area of the orifices 7 may have a planar shape, have a radius, and/or be horizontal or tilted towards the inner periphery of the distribution element 6.

In addition, FIG. 2 illustrates three inflow channels $16_1$, $16_2$, and $16_3$ dedicated to the distribution element 6 such that respective viscous flows 81 are formed to extend tangentially to a peripheral surface 21 of the distribution element 6. That is, the inflow channel $16_1$, $16_2$, and $16_3$ extend so as to engage the peripheral surface 21 of the distribution element 6. In one embodiment, the peripheral surface 21 engaged by a respective inflow channel covers an angle of about 120 degrees. Further, as shown in FIG. 2, the inflow channel $16_1$, $16_2$, and $16_3$ narrow in a radial direction in the area of the peripheral surface 21 of the distribution element 6 until an end portion 22 of a respective inflow channel reaches a vicinity of the outer periphery of the distribution element 6 without touching the outer periphery.

Also, the end portions 22 of the inflow channels $16_1$, $16_2$, and $16_3$ extend within close proximity to a succeeding inflow channel. Thus, a dragging effect of the flow of a melted mass 81 extending tangentially to the distribution element 6 is transmitted to a maximum portion of the peripheral surface 21 of the distribution element 6, whereby the dragging moment generated at the periphery of the distribution element 21 caused by the wall-adhering melt flow 81 is maximized. In addition, a more homogeneous supply of the partial melt flows 8, 8' and 8'' to the outer peripheral area of the distribution element 6 is assured.

In addition, with reference to FIGS. 1 and 2, a maximum height H of the inflow channel 16 is preferably reached at the end portion 22 of the inflow channel 16 and corresponds to a height H of the distribution element 6. That is, a height h of the inflow channel starting at an inflow point 161 of the inflow channel 16 increases to the height H of the distribution element 6 at the end portion 22 of the inflow channel 16. Thus, because of a steady expansion from the initial height h to the height H at the end portion 22 of the inflow channel 16, the viscous flow 81 used to rotate the distribution element 6 is advantageously intensified, and thus a particularly homogeneous distribution of the melted mass is achieved. Further, an inner shell surface below and/or above the inflow channel 16 extending close to the distribution element 6 is preferably tilted and/or rounded, whereby inert zones are advantageously avoided.

Figure 4:
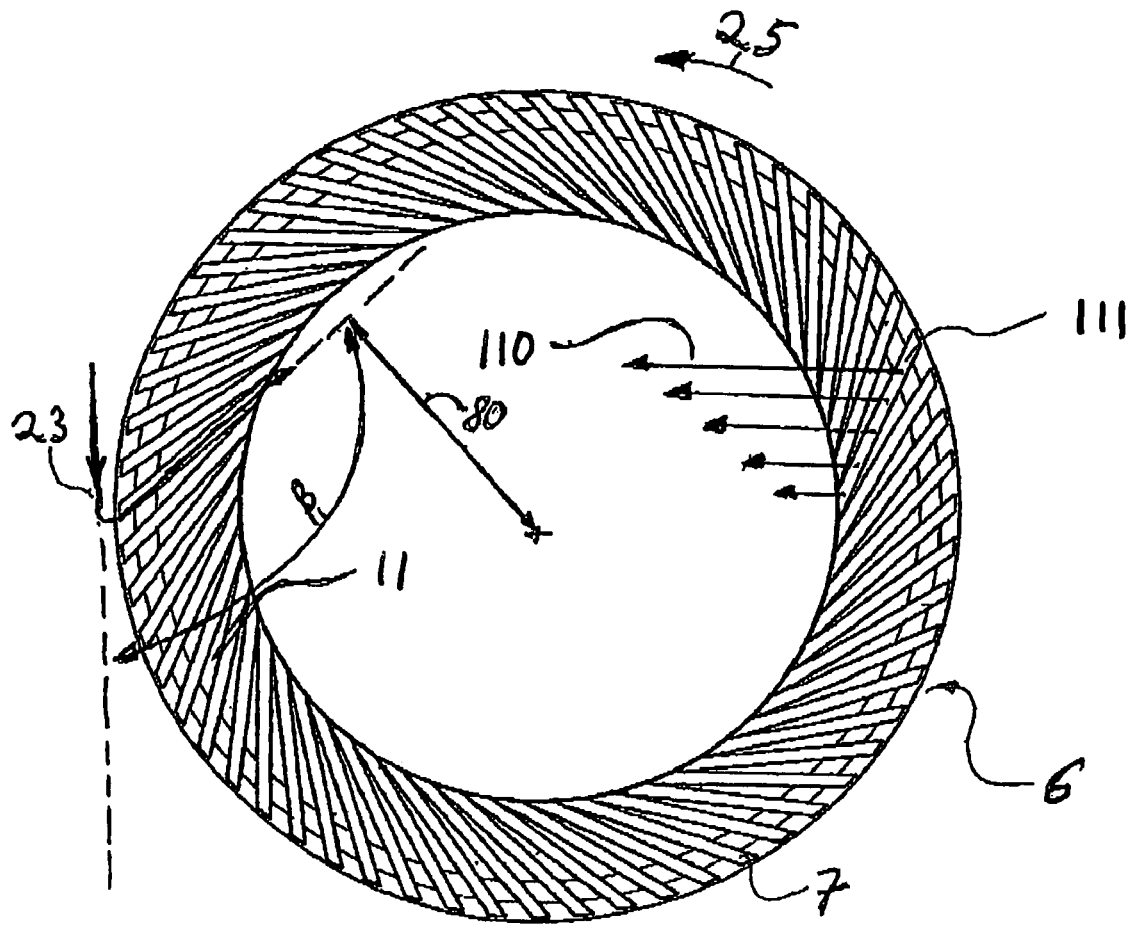
FIG. 4 is a top view of a distribution element included in a die head in accordance with an embodiment of the present invention.

Also, with reference to FIG. 4, the lamellae 11 of the distribution element 6 are tilted in a same way such that partial melt flows 23 are rerouted from a respective inflow channel 16 through the orifices 7 into an inner cavity 24 (see FIG. 2) of the die head 1, thereby passing over an obtuse angle β. By arranging the orifices 7 in this way, a force action generated at an orifice exit 72 (see FIG. 5) by the expansion of the melted mass is utilized with a lever arm 80 according to FIG. 4 to generate a thrust moment, which rotates the distribution element 6 in a direction 25 around the longitudinal axis of the mandrel 4. In addition, a drive torque is generated by the drag effect of the wall-adhering melted mass, which is caused by the melt flow of the inflow channels 16 extending tangentially to the periphery of the distribution element 6.

Figure 5:
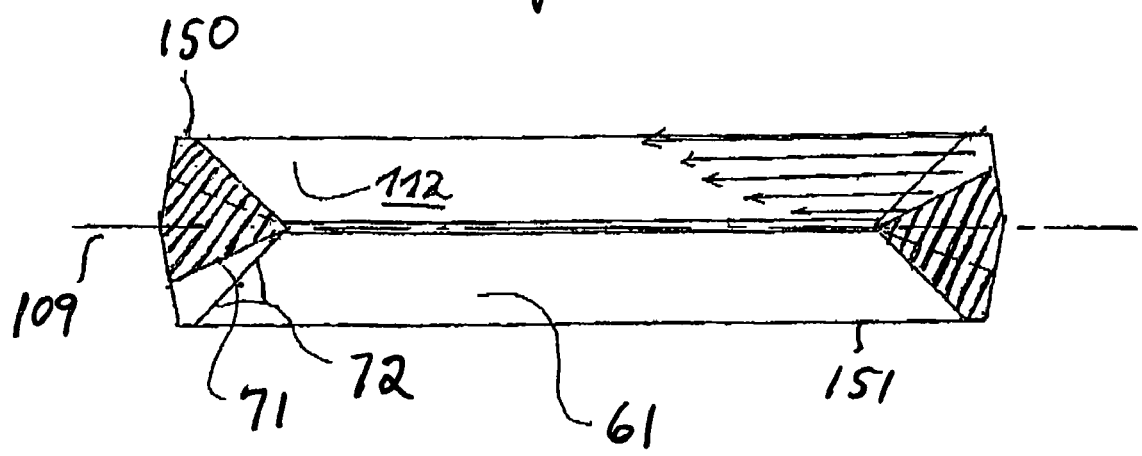
FIG. 5 is a longitudinal section of the distribution element in accordance with the embodiment shown in FIG. 4.

Further, with reference to FIGS. 4 and 5, a base area 71 of the orifices 7 may be planar or have a radius, and in its extension from an outer to the inner radius of the distribution element 6 may be formed as a circular ring, or may be horizontal or tilted. FIGS. 4 and 5 illustrate an embodiment of the distribution element 6 having the base area 71 that is inclined such that an entire interior area 61 of the distribution element 6 is utilized for the discharge of the orifices 7. In this way, the force action predominant at the orifice discharge 72 and generating the thrust factor, which positively aids the torsional motion of the distribution element 6, can be extended across the entire inner surface of the distribution element 6. At the same time, the inner shell surface of the distribution element 6, which generates the braking torque, can be reduced to a minimum. In addition, the lamellae 11 may be straight or curved and have a uniform shape in a peripheral direction, or at regular intervals may have different shapes.

Figure 3:
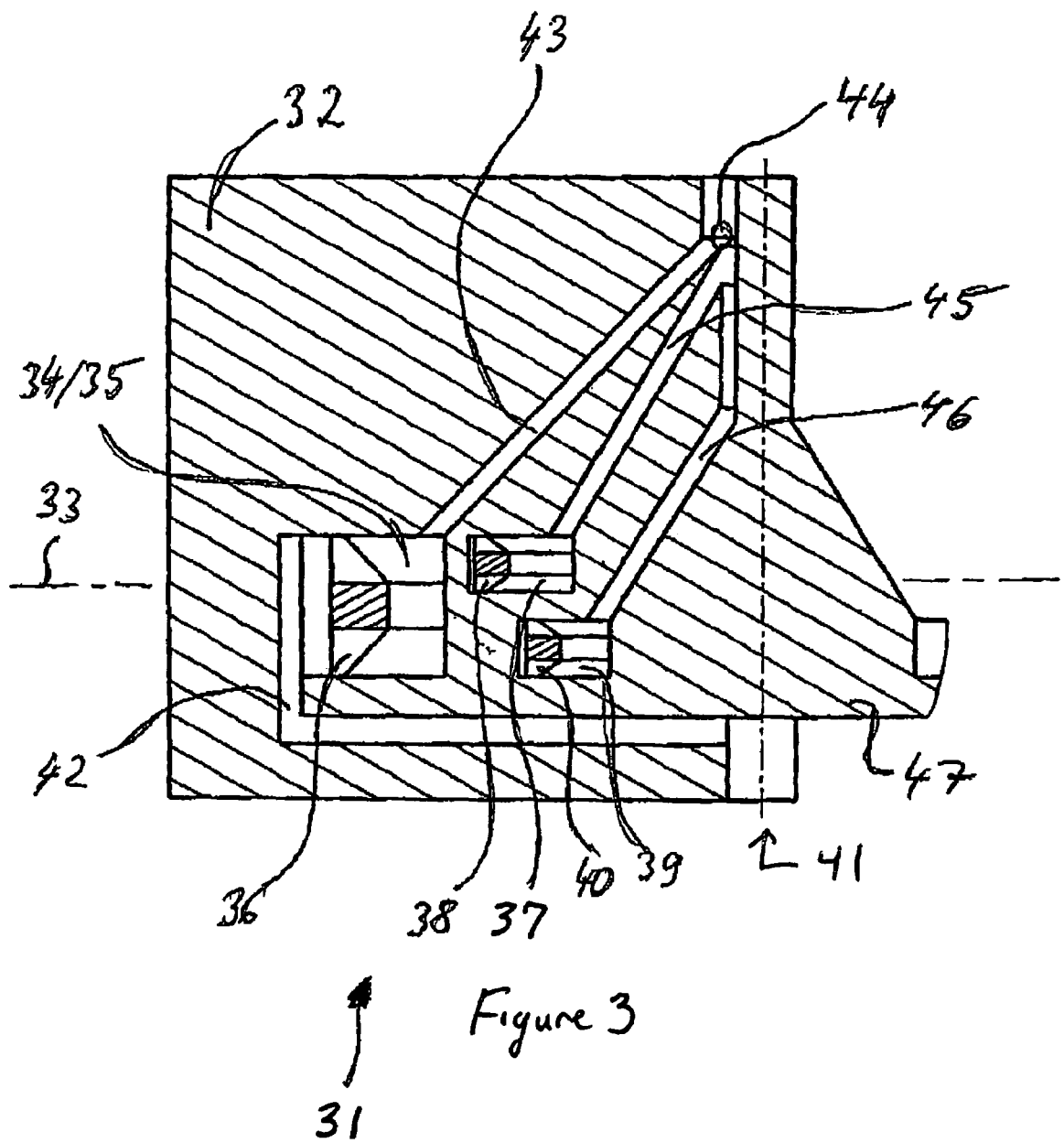
FIG. 3 is a partial longitudinal section of a die head in accordance with an alternative embodiment of the present invention.

Turning now to FIG. 3, which illustrates an alternative embodiment of a die head 31 for coextrusion. As shown, the die head 31 includes a shell segment 32 having a plurality of annular hollow chambers 34 extending in a radial plane 33 of the segment 32. For example, FIG. 3 illustrates an outer hollow chamber 35, which includes a distribution element 36 having a relatively wide radius. Also shown is a first inner cavity 37 with a first inner distribution element 38 and an axially staggered second inner cavity 39 with a second inner distribution element 40. The distribution elements 36, 38, 40 may have a similar shape as the distribution element 6 shown in FIGS. 4 and 5.

Further, the plastic melt is fed into the outer hollow chamber 35 via an axial intake opening 41 and a subsequent intake channel 42. The corresponding intake channels of the other hollow chambers 37 and 39 extend in a similar rotation-symmetric fashion in a peripheral direction around the distribution elements 38, 40. However, the intake openings are arranged in a different peripheral area of the shell segment 32. Further, at least one intake opening is dedicated to each of the hollow chambers 34, 37, 39 from which the intake channels 42 branch off symmetrically in relation to a longitudinal center plane of the die head 31.

In addition, an even supply of the plastic melt to the corresponding hollow chambers 34, 37, 39 assures a self-centration of the distribution elements 36, 38, 40. In addition, the pre-distribution of a melt flow, which is routed in sideways via an orifice arranged at the peripheral area of the shell segment 32, can be accomplished, for example, with multi-pronged distributors, center-sleeve distributors etc. Also, the distribution element is formed as a circular ring element having radial orifices, and routes the flow of melted mass to an inner circular ring segment, where the flow of melted mass is routed in an axial direction inside the central ring channel to the die gap.

For a uniform merging of the plastic melt for coextrusion, a first discharge channel 43 extends from a segment of the outer hollow chamber 35 to an annular junction point 44. Also, a second discharge channel 45 extends from the inside of the first inner hollow chamber 37 and terminates at the annular junction point 44, and a third discharge channel 46 originating in the second inner hollow chamber 39 terminates at the annular junction point 44 so that various plastic melts can be stacked on top of each other.

Thus, coextrusion can be advantageously performed in a space-saving manner because the hollow chambers 35, 37, 39 are arranged in the radial plane 33 of the die head 31. In the example in FIG. 3, the hollow chambers 35, 37, 39 have an annular shape and have a single annular element 36, 38, 40 arranged inside. Further, the die head 31 has the mandrel 47 that increases in width axially in the direction of the orifice 41. Alternatively, the mandrel 47 can be segmented.

Turning next to a description of the distribution element 6 with reference to FIGS. 4 and 5. As shown, the distribution element 6 functioning as a rotor is a circular ring element having a beveled inner ring surface 112. Further, the distribution element 6 includes the lamellae 7, which widen radially towards the outside. The distribution element 6 is also conical in its cross section, and symmetrical to its longitudinal center plane 109. In addition, beveling results in a wider distribution of individual flows of melted mass 110 (see in particular FIG. 4), preferably in a radial and/or axial direction. Also, before reaching the inner ring surface 112 of the distribution element 6, the individual flows 110 of melted mass leave a channel 111 of the distribution element 6 and are thereby separated in an axial and/or radial direction.

Thus, the emerging individual flows of the melted mass 110 are wider in a radial and axial direction, therefore being more effective. In this manner, the joint lines can be removed and homogeneous material may be produced. Additionally, pressure loss in the distribution element 6 is substantially reduced resulting in a multi-layer melt flow medley. Further, because of a low resistance, the speed of the individual melt flows 110 arranged at a distance to the center plane 109 is greater than the speed of the individual melts 110 flowing along the base areas 71 of the orifices 7. In addition, the lamellae 11 on a first face side 150 and an opposite face side 151 of the distribution element 6 are staggered such that one lamella 107 is positioned above the orifice 7. Preferably, the lamellae 107 are tapered towards the interior of the distribution element or are rounded. With such a design and array of the lamellae 107, a considerable improvement of the properties of a semi-finished product with regard to a high quality of the extrudate can be achieved, for example, pipes and foils free of joint lines, thereby improving mechanical and optical properties of the extrudate.

In addition, the channels 111 in FIG. 4 may be curved of rounded, and in particular, sharp edges of the channels 111 may be rounded. Further, all surfaces of the distribution element 6 may be cambered surfaces, and a strength of the ring wall and a diameter and height of the distribution element 6 may be varied. The wall strength, diameter and height of the distribution element 6, which is preferably a circular ring element, can be varied such that a sum of the torques driving the distribution element 6 including the drag and thrust moments is greater than the friction moments caused by the viscosity of the melt.

Figure 6:
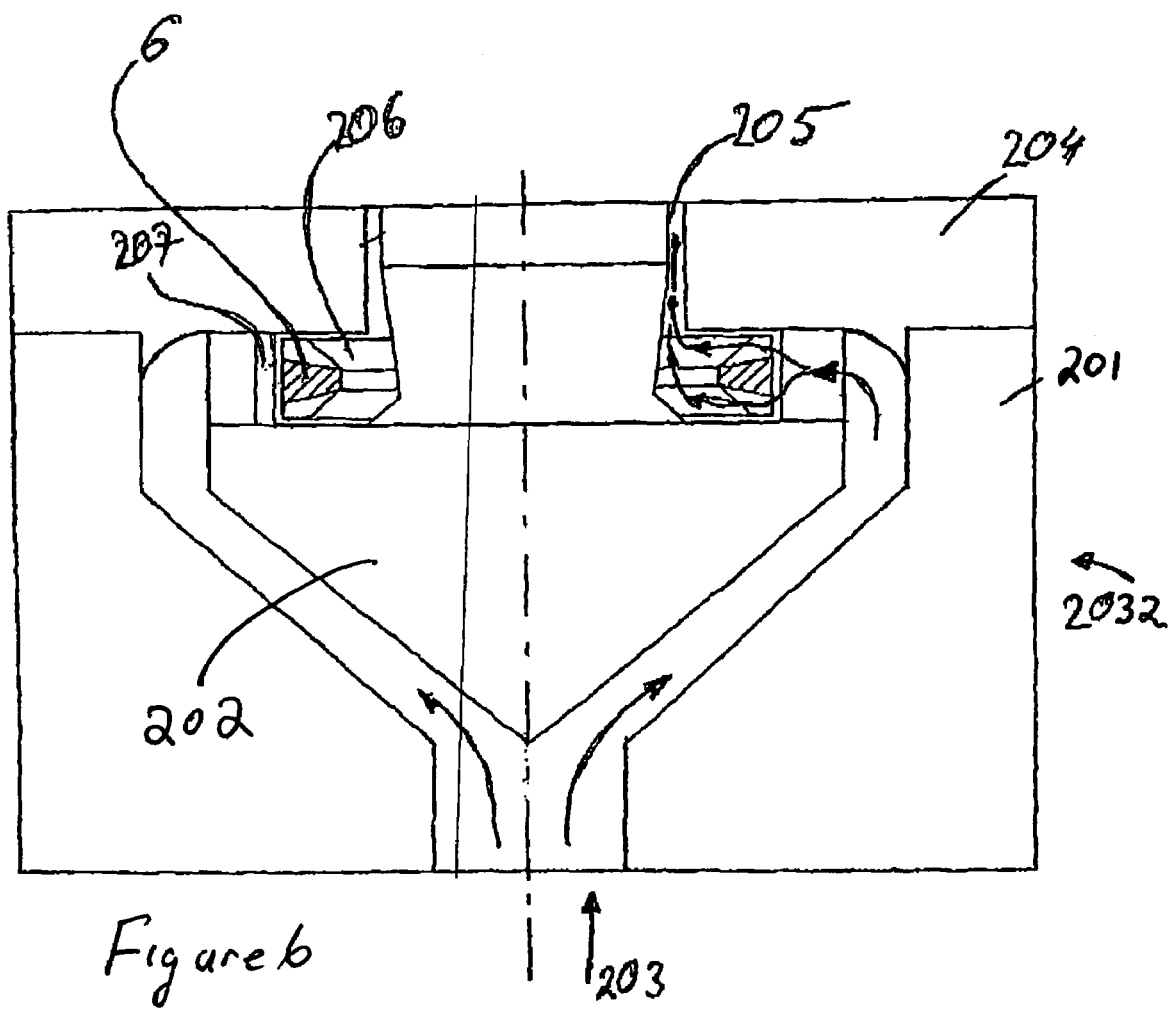
FIG. 6 is a longitudinal section of a die head in accordance with an alternative embodiment of the present invention.

Turning next to FIG. 6, which illustrates another embodiment of a die head 2032 for tube extrusion of thermally sensitive melts such as PVC. As shown, the die head 2032 includes a shell segment 201 having a displacement body 202, which on the side facing a melt intake opening 203 is conical or torpedo-shaped. Further, the displacement body 202 is supported by a cover plate 204 located opposite the intake opening 203. Also included is an annular hollow chamber 206 extending along the side of the displacement body 202 facing a nozzle discharge 205. The annular hollow chamber 206 includes the distribution element 6 shown in FIGS. 4 and 5. Further, because a plurality of melt-conveying inflow channels 207 have a similar design as the inflow channels 16, the drag and thrust moments resulting from the beneficially arranged melt routing are likewise utilized for the rotation of the distribution element 6.

In addition, the inflow of melted mass may be conveyed to the distribution element 6 either from the outside and/or from the inside. Further, a radial direction exterior outer peripheral surface of the distribution element and/or an in a radial direction interior inner peripheral surface of the distribution element is thereby impacted by the melt.

Further, the melted mass may be a thermoplastic material, for example. The distribution effect of the present invention can also be used for other free-flowing mediums. Thus, the die head of the present invention may be used to form multilayered tubes, and also for the sheathing of string-shaped semi-finished products.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A die head for an extruder, comprising:
an outer shell;
an inner cylindrical mandrel;
an annular die gap at a discharge side of the die head;
at least one intake opening for receiving a melted mass;
at least one distribution element for distributing the melted mass to a central ring channel terminating in the die gap;
an inflow channel connecting the at least one intake opening to the at least one distribution element,
wherein at least one of the distribution element and the inflow channel are formed such that the distribution element is set into torsional motion around a longitudinal axis of the mandrel due to a flow of the melted mass, and the flow of melted mass is routed to the central ring channel, and
wherein the distribution element includes a plurality of lamellae interspersed with orifices such that an action of force occurs on the distribution element due to the flow of the melted mass.

2. The die head according to claim 1, wherein at least one of the distribution element and the inflow channel are formed such that a tangential flow of the melted mass occurs on a peripheral surface of the distribution element.

3. The die head according to claim 1, wherein the orifices are oriented such that an imaginary extension of a direction of the flow of melted mass at an exit of the orifice runs at a distance to a centerline of the mandrel.

4. The die head according to claim 1, wherein the orifices are oriented such that the flow of melted mass is re-routed around an obtuse angle at an entry of the orifices so that drag and thrusting moments, which move in a same rotational direction, add up to a total torque setting the distribution element in motion.

5. The die head according to claim 2, wherein at the peripheral surface of the distribution element where the tangential flow occurs, the distribution element has a relatively large effective surface for transmitting a force of the tangentially flow of melted mass.

6. The die head according to claim 1, wherein a height of the inflow channel increases in a flow direction of the melted mass.

7. The die head according to claim 1, wherein the lamellae are pointed or rounded in a flow direction of the melted mass.

8. The die head according to claim 1, wherein one end of a first inflow channel is arranged close to a succeeding inflow channel.

9. The die head according to claim 1, wherein the distribution element is beveled and/or rounded at an inner ring surface thereof.

10. The die head according to claim 1, wherein the lamellae and/or the orifices on opposing face sides of the distribution element are respectively arranged in a staggered array.

11. A die head for an extruder, comprising:
an outer shell;
an inner cylindrical mandrel
an annular die gap at a discharge side of the die head;
at least one intake opening for receiving a melted mass;
at least one distribution element for distributing the melted mass to a central ring channel terminating in the die gap;
an inflow channel connecting the at least one intake opening to the at least one distribution element,
wherein at least one of the distribution element and the inflow channel are formed such that the distribution element is set into torsional motion around a longitudinal axis of the mandrel due to a flow of the melted mass, and the flow of melted mass is routed to the central ring channel,
wherein the shell includes a plurality of shell segments, each having a dedicated distribution element, and
wherein the shell segments are stacked on top of each other around the distribution elements, and each shell segment has at least one dedicated inflow channel.

12. The die head according to claim 1, wherein the distribution element is arranged in an annular hollow space within the outer shell.

13. The die head according to claim 1, wherein the distribution element is a circular ring element.

14. The die head according to claim 1, wherein the distribution element is arranged in a torpedo-shaped conical displacement body, whereby the melted mass collides with a tip of the displacement body, and the flow of melted mass is circularly distributed.

15. The die head according to claim 2, wherein the tangential flow occurs at an outer peripheral surface of the distribution element.

16. The die head according to claim 2, wherein the tangential flow occurs at an inner peripheral surface of the distribution element.

17. A die head for an extruder, comprising:
an outer shell;
an inner cylindrical mandrel;
an annular die gap at a discharge side of the die head;
at least one intake opening for receiving a melted mass;
at least one distribution element for distributing the melted mass to a central ring channel terminating in the die gap;
an inflow channel connecting the at least one intake opening to the at least one distribution element,
wherein at least one of the distribution element and the inflow channel are formed such that the distribution element is set into torsional motion around a longitudinal axis of the mandrel due to a flow of the melted mass, and the flow of melted mass is routed to the central ring channel, and
wherein the distribution element includes a plurality of lamellae interspersed with orifices arranged such that an action of force occurs at an exit of the orifices due to a material expansion of the melted mass.

* * * * *